United States Patent [19]

Forker, Jr.

[11] 4,440,810

[45] Apr. 3, 1984

[54] METHOD FOR DECORATING LOW-EXPANSION CERAMIC ARTICLES

[75] Inventor: Ray B. Forker, Jr., Beaver Dams, N.Y.

[73] Assignee: Corning Glass Works, Corning, N.Y.

[21] Appl. No.: 370,678

[22] Filed: Apr. 22, 1982

[51] Int. Cl.³ .............................................. B05D 3/02
[52] U.S. Cl. .............................. 427/376.2; 427/397.7; 427/397.8; 427/427
[58] Field of Search .............. 427/397.7, 397.8, 376.2, 427/427, 189

[56] References Cited

U.S. PATENT DOCUMENTS

| | | | |
|---|---|---|---|
| 1,977,625 | 10/1934 | Ernst | 427/427 |
| 2,607,702 | 8/1952 | Jannesa | 106/172 |
| 3,346,410 | 10/1967 | McCarthy | 427/427 |
| 3,445,266 | 5/1969 | Wittman | 427/427 |
| 3,663,244 | 5/1972 | Martin | 106/49 |
| 4,038,448 | 7/1977 | Boyd et al. | 428/212 |
| 4,158,080 | 6/1979 | Wexell | 428/212 |
| 4,158,081 | 6/1979 | Wexell | 428/212 |

*Primary Examiner*—Michael R. Lusignan
*Assistant Examiner*—Janyce A. Bell
*Attorney, Agent, or Firm*—K. van der Sterre; C. S. Janes, Jr.

[57] ABSTRACT

A method for spray-decorating a low-expansion glass, glass-ceramic or ceramic article having an expansion coefficient in the range of about $0-35 \times 10^{-7}/°C$. with a relatively high expansion fritted ceramic enameling composition having an expansion coefficient in the range of about $45-75 \times 10^{-7}/°C$. wherein good surface coverage and color uniformity in combination with acceptable spall resistance in the applied enamel are provided by applying the enameling composition as a very thin film in the form of a non-aqueous oil-based spraying suspension.

6 Claims, No Drawings

METHOD FOR DECORATING LOW-EXPANSION CERAMIC ARTICLES

BACKGROUND OF THE INVENTION

The present invention is in the field of ceramic glazing and particularly relates to a method for spray-decorating low-expansion glass, glass-ceramic or ceramic ware with enamels having relatively high thermal expansion coefficients.

As is well known, typical enameling compositions for decorating glass or ceramic substrates comprise a pigment component and a fluxing component. The pigment consists of a highly colored inorganic element or compound, which may or may not be admixed or encapsulated with a glass or other matrix material, while the flux typically consists of a fritted, low-melting glass, i.e., a glass in finely divided form. The fluxing component, which frequently comprises at least about 80% by weight of the enameling composition, fuses when the enamel is fired to provide an impermeable, chemically durable matrix for the pigment.

One of the problems presented by the development of low-expansion ceramic products such as glass-ceramic culinary ware has been the development of enameling compositions exhibiting sufficiently low thermal expansion for these products. A suitable enamel or glaze will have a thermal expansion coefficient on the same order of, or preferably below, the expansion coefficient of the ceramic body to which it is applied, so that the enamel will not crack or craze in use. It is difficult to formulate an enamel flux glass which fires to a smooth enamel yet has an expansion coefficient sufficiently low to avoid crazing or spalling from a low-expansion substrate, because glass constituents which aid fluxing frequently increase the expansion coefficient of the enamel.

U.S. Pat. No. 3,663,244 describes a family of enameling compositions which devitrify on firing and thus provide an enamel layer having a relatively low expansion coefficient, e.g., an average linear coefficient of thermal expansion (expansion coefficient) in the range of about $15-30 \times 10^{-7}/°C$. These expansion coefficients are sufficiently low to make the enamel compatible with low-expansion glass, glass-ceramic or ceramic articles, which for the purpose of the present description are articles having expansion coefficients in the range of about $0-35 \times 10^{-7}/°C$.

Enameling compositions such as disclosed in the aforementioned patent may be applied to large areas of a ceramic substrate by spraying. For this purpose, an aqueous fluid suspension of the composition, having a viscosity suitable for spraying (typically in the range of 10-200 poises), is prepared. This suspension includes a water base, an alcohol component for rapid drying, and the fritted enameling composition, and is applied in a thickness which will provide a fired enamel layer having a thickness in the range of 1-2 mils (25-50 microns) on the glass-ceramic surface to be decorated. This thickness provides adequate gloss and color in the glazed article.

Enameling compositions offering more intense colors and good chemical durability and gloss when applied at somewhat lower firing temperatures have been developed for application to opal glassware, as described in U.S. Pat. Nos. 4,038,448 and 4,158,080. A related family of enameling compositions, described in U.S. Pat. No. 4,158,081, has been proposed for lower expansion glass or glass-ceramic articles, ie., articles having expansion coefficients below $40 \times 10^{-7}/°C$. The compositions described in these patents provide enamels hereinafter referred to as high-expansion decorating enamels, having expansion coefficients after firing which are typically in the range of $45-75 \times 10^{-7}/°C$. This is substantially higher than the expansion coefficients of the low-expansion devitrifiable enamels referred to above, and higher than the expansions of some of the low-expansion ware to which these enamels would desirably be applied.

High-expansion, low-firing enameling compositions such as described in these last mentioned three patents are typically applied as very thin films to glass or glass-ceramic substrates. Application is by silk-screening, or by transfer from decals which are prepared by silk-screen or lithographic techniques. The compositions comprise the conventional fritted glass flux and pigment components, but they are applied as constituents of a screening paste. The screening paste is typically a non-aqueous medium comprising a silk-screening oil base and a volatile solvent in combination with the enameling composition, the oil and solvent constituting the vehicle for the fritted enamel.

It would be desirable to be able to apply large-area coatings of these newer, high-expansion, low-firing enamels to low-expansion glass, glass-ceramic or ceramic ware by spraying, instead of by decals or screening. The new enamels exhibit higher gloss and better color characteristics than the older devitrifiable enamels, and provide excellent chemical durability. However, attempts to apply such enamels by spraying have not been successful. Substantial difficulties have been encountered in trying to obtain good coverage and uniform coloration in the sprayed layer, while at the same time achieving a thin fired enamel layer which will not craze or spall from the low-expansion ceramic substrate in use. Excessively thick enamel layers do not adhere to lower expansion substrates because of the relatively large thermal expansion mismatch between the enamel and the substrate.

It is therefore a principal object of the present invention to provide a method for applying a high-expansion enameling composition to a low-expansion glass, glass-ceramic or ceramic article which produces a glossy and uniformly colored enamel layer thereon.

Other objects and advantages of the invention will become apparent from the following description thereof.

SUMMARY OF THE INVENTION

The present invention is founded upon the discovery of unexpected advantages arising from the use of a non-aqueous suspension of a fritted high-expansion decorative enameling composition as a medium for spraying large area coatings on low-expansion ceramic substrates. More specifically, it has been found that very thin, spall resistant coatings of a high-expansion enamel, exhibiting coverage and color uniformity substantially better than obtainable with conventional spraying formulations, can be obtained using fluid suspensions of the enamels in a screening oil/solvent vehicle.

Thus the invention comprises an improvement in a method for decoratively glazing a low-expansion glass, glass-ceramic or ceramic culinary article where a fluid suspension of a fritted enameling composition is sprayed onto the surface of the article to form a coating which is dried and fired to provide a decorative enamel. In accordance with that improvement, the fluid suspension used for spraying consists essentially of the fritted, high-expansion enameling composition and a vehicle which comprises a silk-screening oil base and a volatile solvent. This suspension is sprayed on the low-expansion substrate to provide a sprayed coating having a thickness such that, after firing, the resulting smooth enamel layer has a thickness not exceeding about 18 microns, yet exhibits excellent uniformity of thickness and coloration, good gloss, and good durability against spalling or crazing.

DETAILED DESCRIPTION

The essential element of the method of the invention is the use of a non-aqueous suspension of the fritted enameling composition to apply the frit coating. Attempts to use aqueous suspensions of these enamels have invariably resulted in fired enamel decorations exhibiting either non-uniform coverage and coloration, or else spalling from the substrate. Hence, in order to achieve uniform coverage with a water-based spray, sprayed coatings at least about one mil in thickness were necessary; yet after firing the enamel coating exhibited very poor resistance to spalling damage.

The reasons for the surprising improvement in durability and color uniformity exhibited by enamels applied using non-aqueous vehicles in accordance with the invention are not presently understood. The superior results observed do not appear to depend strongly on the viscosity of the fluid suspension used for spraying, nor do they depend upon the composition of the enamel frit or the selection of a particular screening oil to be used as the vehicle base. Good results have been obtained with a number of different base oils, and at a number of different spraying viscosities.

The composition of the fritted, high-expansion enameling composition used to form the suspension is not critical; any of the known decorating compositions of this type, such as those described in U.S. Pat. Nos. 4,038,448, 4,158,080 and 4,158,081, may be used. These are compositions comprising lead borosilicate glasses as the enamel flux, which after firing have expansion coefficients in the range of about $45-75 \times 10^{-7}/°C$. The flux glass normally comprises 80–99% of the enamel and may have a composition comprising 0.2–3% $Li_2O$, 4–12% $B_2O_3$, 3–10% $ZrO_2$, 40–60% PbO and 25–40% $SiO_2$ as essential constituents. Up to about 10% total of optional constituents selected from the group consisting of $TiO_2$, CdO, alkali metal oxides, ZnO, $Al_2O_3$, $SnO_2$ and other oxides may be present as minor constituents to modify the properties of the enamels in the known fashion.

For best spraying, the fluid suspension containing the fritted enameling composition and vehicle components preferably has a viscosity in the range of about 10–150 poises. The viscosity depends upon the relative amounts of frit and vehicle present, and upon the quantity of solvent used in the vehicle. Typical screening oil base:frit weight ratios are between about 1:2 and 1:4, depending upon the consistency desired for spraying. The viscosity can readily be adjusted for any particular frit ratio by changing the proportions of screening oil base and solvent in the vehicle component.

Typical solvent:screening oil base volume ratios for the spraying suspension are in the range of about 1:1 to 3:1, and are varied mainly to control the drying characteristics of the suspension. The solvent is desirably a volatile organic liquid, most preferably methanol ($CH_3OH$), which is compatible with the screening oil base but permits rapid drying of the sprayed coating.

The selection of the silk-screening oil to be used as the vehicle base is not critical; good results have been obtained with many of the pine oil-based screening oil or so-called squeegee oil compositions of the prior art. U.S. Pat. No. 2,607,702 discloses some formulations for such preparations, and others are known. The most convenient source of screening oil preparations for use as the vehicle base are the commercially available screening media. Examples of media which can be used are Drakenfeld 479, Drakenfeld Medium 175, Drakenfield Medium 324, and Drakolene TM screening medium, commercially available from Ciba-Geigy Corporation, Plastics and Additives Division, Ardsley, N.Y. 10502.

The invention is further illustrated by the following detailed examples, which are intended to be illustrative rather than limiting.

EXAMPLE I

A fluid suspension of a fritted decorative enameling composition suitable for application to the bottom surface of a low-expansion glass-ceramic baking dish is prepared. The baking dish is formed of Corning Code 9608 glass-ceramic material, having a predominately beta spodumene crystal phase and a thermal expansion coefficient of about $12 \times 10^{-7}/°C$.

The fluid suspension is prepared by mixing a quantity of the fritted enameling composition, consisting of 1200 grams of fritted enamel flux glass and 12 grams of a brown ceramic pigment, with 600 ml of a pine oil-containing vehicle base and 800 ml of methanol. The vehicle base is Drakenfeld 479 screening oil medium. The enamel flux glass consists essentially of about 50.2% PbO, 33.2% $SiO_2$, 5.2% $P_2O_3$, 1.1% $Li_2O$, 2.1% $TiO_2$, 6.9% $ZrO_2$, and 1.2% CdO by weight, having a softening point of about 605° C. and a thermal expansion coefficient of about $58.5 \times 10^{-7}/°C$.

The suspension is ball-milled for one hour and is then applied by spraying at room temperature and at a viscosity of about 100 poises to the bottom surface of the glass ceramic baking dish to form a very thin coating. The coated dish is then fired at 680° C. for five minutes to convert the coating to a smooth enamel film having a thickness of about 10 microns. The fired enamel film exhibits good gloss, uniform coloration, and excellent chemical and physical durability.

EXAMPLE II

The procedure of Example I is repeated except that a sprayable suspension having a viscosity of about 15 poises and consisting of about 1200 grams of the fritted enamel and pigment, about 600 ml of a screening oil vehicle base consisting of Drakenfeld 324 screening medium, and about 1800 ml of methanol is used. This suspension applied to the bottom of the glass-ceramic baking dish by spraying to form a coating, which after firing forms an enamel film about 7 microns in thickness. The fired enamel again exhibits good gloss, excellent color uniformity, and good chemical and physical durability.

EXAMPLE III

The procedure of Example I is again repeated except that a sprayable enamel suspension having a viscosity of about 100 poises and consisting of about 800 grams of the fritted enamel plug pigment, about 225 ml of a screening oil vehicle base consisting of Drakolene ™ screening medium and about 225 ml of methanol is used. When applied as a thin coating to produce a fired enamel film of about 10 microns thickness, the fired enamel again exhibits good gloss, excellent color uniformity, and good physical and chemical durability.

EXAMPLE IV (PRIOR ART)

An attempt is made to apply a high-expansion enamel to the bottom surface of a Corning Code 9608 glass-ceramic baking dish such described in Example I by spraying using a conventional water-based suspension of the enameling composition. The prepared suspension comprises about 50 lbs. of the fritted enamel of Example I, and 20 lbs. of a water/methanol mixture consisting of 1 part methanol and 2½ parts water by volume. The viscosity of this suspension is about 100 poises.

The suspension thus provided is applied by spraying to the bottom surface of the glass-ceramic baking dish to form a relatively thick coating, and the vessel and coating are fired at 700° C. for five minutes to convert the coating to a smooth enamel layer. A major difficulty encountered is running of the sprayed coating, resulting in uneven coating thickness. The sprayed coating must be applied in sufficient thickness to provide a fired enamel layer at least about 1.5 mils in thickness if good coverage of the vessel surface is to be obtained. Thinner layers provide enamel layers which are commercially unacceptable from the standpoint of color uniformity.

Although the enameled dish produced as described exhibits uniform coloration, the physical durability of the enamel against scuffing and spalling is very poor. If adhesive-backed cellophone tape is applied to an enameled surface and the vessel is heated to 50° C. for 15 minutes, and if the tape is then resealed against the hot enameled surface and the vessel allowed to cool, removal of the tape can actually pull the enamel from many weakly-bonded areas of the enamel coating. No such removal is observed in the case of a thin, oil-sprayed enamel coating provided in accordance with Example I.

I claim:

1. A method for glazing a low-expansion glass, glass-ceramic or ceramic substrate wherein a fluid suspension of a fritted, high-expansion enameling composition is sprayed onto the surface of the substrate to form a coating and the coating is dried and fired to fuse the composition into a smooth enamel layer, characterized in that:
    (a) the fluid suspension consists essentially of a fritted, high-expansion enameling composition and a non-aqueous vehicle, the enameling composition having a fired expansion coefficient of about $45-75 \times 10^{-7}/°C$. and comprising a flux glass with a composition comprising 25-40% $SiO_2$, 40-60% PbO, 3-10% $ZrO_2$, 4-12% $B_2O_3$ and 0.2-3% $Li_2O$, and the non-aqueous vehicle comprising a squeegee oil base and a volatile solvent; and
    (b) the sprayed coating is applied in a thickness such that the smooth enamel layer does not exceed about 18 microns in thickness.

2. A method in accordance with claim 1 wherein, in the fluid suspension, the squeegee oil base:frit weight ratio is between about 1:2 and 1:4, and the solvent:squeegee oil base volume ratio is between about 1:1 and 3:1.

3. A method in accordance with claim 2 wherein the squeegee oil base consists essentially of a pine oil screening medium.

4. A method in accordance with claim 2 wherein the fluid suspension has a viscosity in the range of about 10-150 poises.

5. A method in accordance with claim 2 wherein the low-expansion substrate has an average linear coefficient of thermal expansion in the range of about $0-35 \times 10^{-7}/°C$.

6. A method in accordance with claim 5 wherein the substrate is a glass-ceramic cooking vessel having a thermal expansion coefficient in the range of about $5-15 \times 10^{-7}/°C$.

* * * * *